(12) United States Patent
Takehara et al.

(10) Patent No.: US 9,919,717 B2
(45) Date of Patent: Mar. 20, 2018

(54) DRIVING ASSISTANCE DEVICE AND DRIVING ASSISTANCE METHOD

(71) Applicant: Mitsubishi Electric Corporation, Tokyo (JP)

(72) Inventors: Nariaki Takehara, Tokyo (JP); Koji Iida, Tokyo (JP); Takahisa Aoyagi, Tokyo (JP); Tetsuji Haga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/113,871

(22) PCT Filed: Apr. 14, 2014

(86) PCT No.: PCT/JP2014/060607
§ 371 (c)(1),
(2) Date: Jul. 25, 2016

(87) PCT Pub. No.: WO2015/159341
PCT Pub. Date: Oct. 22, 2015

(65) Prior Publication Data
US 2016/0347328 A1 Dec. 1, 2016

(51) Int. Cl.
*B60W 50/10* (2012.01)
*B60W 50/08* (2012.01)
(Continued)

(52) U.S. Cl.
CPC ........ *B60W 50/085* (2013.01); *B60W 30/182* (2013.01); *B60W 50/045* (2013.01);
(Continued)

(58) Field of Classification Search
CPC ..... B60W 2050/0088; B60W 2540/12; B60W 2050/0089; B60W 2520/06;
(Continued)

(56) References Cited

U.S. PATENT DOCUMENTS

2011/0118939 A1* 5/2011 Kawamata ............ B60W 10/06
701/41
2013/0054049 A1 2/2013 Uno
(Continued)

FOREIGN PATENT DOCUMENTS

JP 5-162569 A 6/1993
JP 2003-080970 A 3/2003
(Continued)

OTHER PUBLICATIONS

International Search Report of PCT/JP2014/060607 dated Jul. 8, 2014.

*Primary Examiner* — Rodney A Butler
(74) *Attorney, Agent, or Firm* — Sughrue Mion, PLLC; Richard C. Turner

(57) ABSTRACT

Position information of a vehicle 100 and feature amounts of driving operations by a driver are acquired as triggered by occurrence of switching from an automatic driving mode to a manual driving mode, and a driving operation to be corrected in the automatic driving mode and a correction amount thereof, are determined from these feature amounts. A driving operation in the automatic driving mode is corrected using the determination result, so that the vehicle 100 is controlled in the automatic driving mode in which the corrected driving operation is included.

13 Claims, 8 Drawing Sheets

(51) Int. Cl.
*B60W 30/182* (2012.01)
*B60W 50/04* (2006.01)
*B60W 50/14* (2012.01)
*B60W 50/00* (2006.01)

(52) U.S. Cl.
CPC .......... *B60W 50/082* (2013.01); *B60W 50/10* (2013.01); *B60W 50/14* (2013.01); *B60W 2050/0074* (2013.01); *B60W 2050/0088* (2013.01); *B60W 2050/0089* (2013.01); *B60W 2050/046* (2013.01); *B60W 2520/06* (2013.01); *B60W 2520/10* (2013.01); *B60W 2540/10* (2013.01); *B60W 2540/12* (2013.01); *B60W 2540/18* (2013.01)

(58) Field of Classification Search
CPC ............ B60W 50/085; B60W 50/045; B60W 50/082; B60W 50/14; B60W 30/182; B60W 50/10; B60W 2050/046; B60W 2540/10; B60W 2050/0074
See application file for complete search history.

(56) References Cited

U.S. PATENT DOCUMENTS

| | | | |
|---|---|---|---|
| 2013/0158771 A1* | 6/2013 | Kaufmann | B60W 40/08 701/23 |
| 2013/0162829 A1* | 6/2013 | Kadowaki | B62D 15/028 348/148 |
| 2014/0159886 A1 | 6/2014 | Hasegawa et al. | |

FOREIGN PATENT DOCUMENTS

| | | |
|---|---|---|
| JP | 2003-276473 A | 9/2003 |
| JP | 2007-168788 A | 7/2007 |
| JP | 4277907 B2 | 6/2009 |
| JP | 2009-234442 A | 10/2009 |
| JP | 2010-83402 A | 4/2010 |
| JP | 2011-162075 A | 8/2011 |
| JP | 2013-193671 A | 9/2013 |
| JP | 5353745 B2 | 11/2013 |
| WO | 2011/145165 A1 | 11/2011 |
| WO | 2013/005293 A1 | 1/2013 |

* cited by examiner

FIG.5

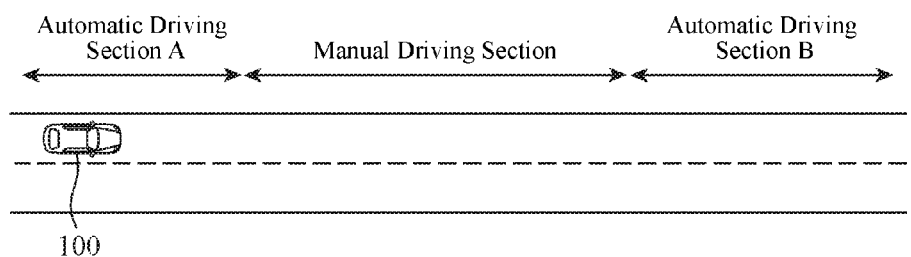

FIG.6

| Features | | First Time | Second Time | Third Time | ... |
|---|---|---|---|---|---|
| Spot Information | Straight Road | 1 | 1 | 1 | |
| | Curve | 0 | 0 | 0 | |
| | Intersection | 0 | 0 | 0 | |
| | Curve Exists Ahead | 0 | 0 | 0 | |
| | Intersection Exists Ahead | 0 | 0 | 0 | |
| Driving Information | Acceleration Operation | | | | |
| | Deceleration Operation | | | | |
| | Steering Operation | | | | |
| | Traveling Direction | 0 | 0 | 0 | |
| Periphery Information | Preceding Vehicle Exists | 0 | 0 | 0 | |
| | Oncoming Vehicle Exists | 0 | 0 | 0 | |
| | Right-Lane Vehicle Exists | 0 | 0 | 0 | |
| | Left-Lane Vehicle Exists | 0 | 0 | 0 | |
| | Obstacle Exists | 0 | 0 | 0 | |
| ⋮ | ⋮ | | | | |

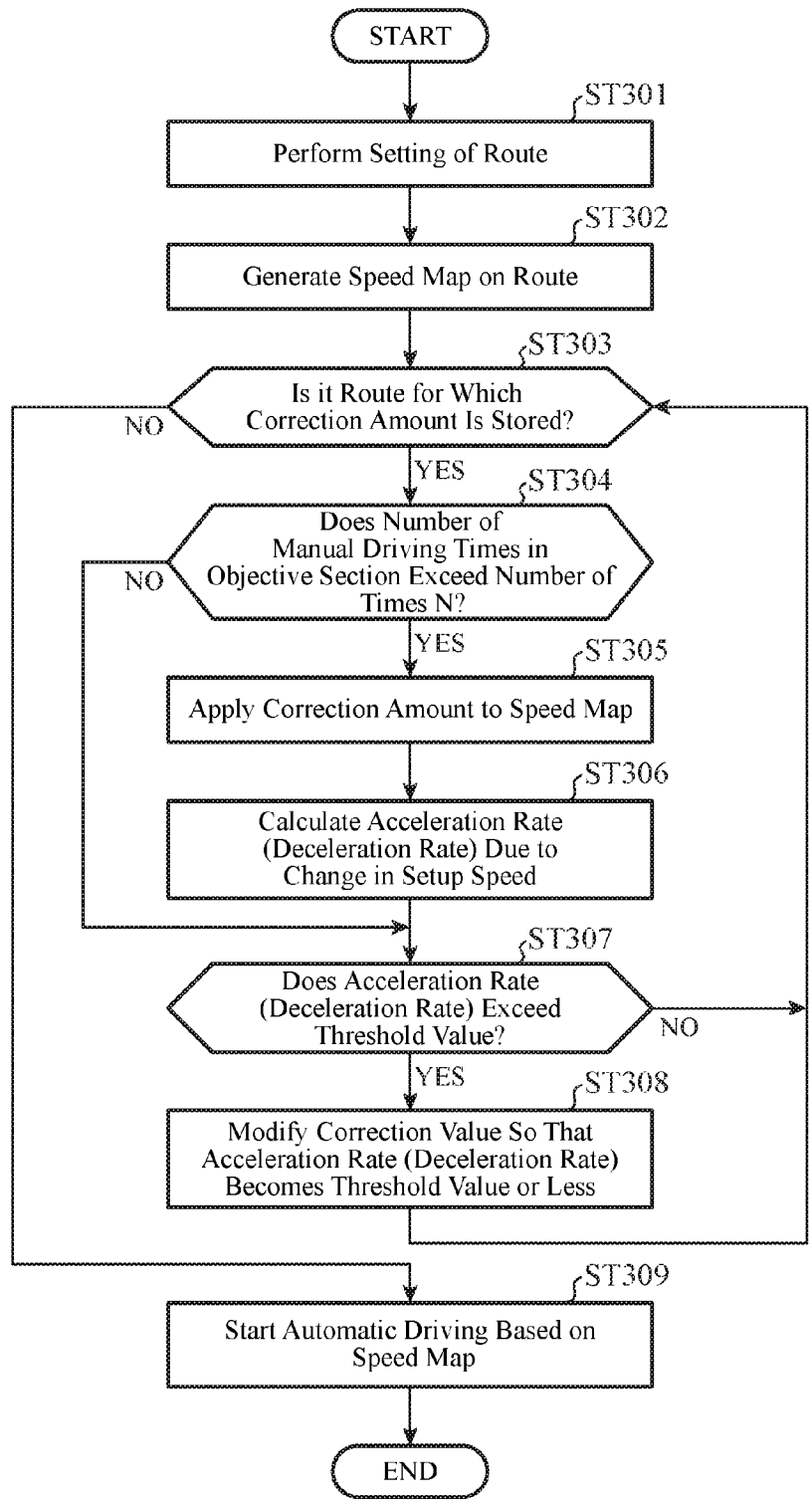

DRIVING ASSISTANCE DEVICE AND DRIVING ASSISTANCE METHOD

TECHNICAL FIELD

The present invention relates to a driving assistance device and a driving assistance method for vehicles capable of making switching between automatic driving and manual driving.

BACKGROUND ART

Heretofore, there has been proposed a technique in which a curvature radius of a curve in a road, limited-speed information, traffic lane information, and the like are acquired from map information, to thereby optimize the speed of a vehicle. In this regard, if a position and a speed as references for optimization are determined in a single uniform way, a possibility arises that the vehicle speed becomes minimum before a preferable position or the start of acceleration is significantly delayed, and thus driving assistance desired by the driver is not performed.

In that regard, it is also conceivable that the optimum speed is learned based on a driving operation by the driver; however, the amount of information related to the driving operation is huge during traveling of the vehicle, so that, in order to store them and to obtain the optimum speed, a large capacity memory and much calculation processing are required.

Further, because a driving operation unwanted by the driver is also learned, there is a case where a driving control is performed with an uncomfortable feeling for the driver.

On the other hand, in Patent Document 1, there is disclosed a traveling control device that calculates a target speed and a target acceleration rate based on a state of the preceding vehicle and map information, to thereby control traveling of the host vehicle.

Meanwhile, a driving assistance system described in Patent Document 2 records, when the host vehicle enters a target area such as a corner, respective sets of feature points corresponding to plural different types, to thereby generate based on the recorded feature points, a variation map in which degrees of variations of the feature points are shown for each of the types. Then, driving assistance is executed so that a feature point having an average value of the degree of variation in the variation map is reproduced.

CITATION LIST

Patent Document

Patent Document 1: Japanese Patent Application Laid-open No. 2007-168788
Patent Document 2: Japanese Patent Application Laid-open No. 2011-162075

SUMMARY OF THE INVENTION

Problems to be Solved by the Invention

According to the device described in Patent Document 1, there is a problem that, when the preceding vehicle is driven at a speed beyond that expected by the driver, or when a traveling speed or a steering position that is uniquely determined based on the map information is different to that intended by the driver, the traveling control by the device gives an uncomfortable feeling to the driver.

Meanwhile, in order to perform driving control without giving an uncomfortable feeling to the driver, in Patent Document 2, when the host vehicle enters a target area, respective sets of feature points corresponding to plural different types are recorded, and a driving control will be performed so as to reproduce the feature point therein. However, it is necessary to constantly store the feature points over all areas targeted by the system, thus causing a problem that the memory usage is large and also the system processing load is high.

Furthermore, according to the device described in Patent Document 2, even when a driving operation is not usually operated one, such as, when the brake pedal is pressed in response to sudden braking of the preceding vehicle or when the steering wheel is turned so as to avoid a fallen object, the feature points are stored if they are in the target areas. Thus, there is a possibility that driving assistance unintended by the driver is eventually performed.

This invention has been made to solve the problems as described above, and an object thereof is to provide a driving assistance device and a driving assistance method capable of making correction in automatic driving in a manner matched to the driver, while reducing the memory usage and the processing load.

Means for Solving the Problems

The driving assistance device of the invention is a driving assistance device for assisting driving of a vehicle using switching between an automatic driving mode and a manual driving mode by a driver, and comprises: an information receiver that acquires respective position information of the vehicle and feature amounts of driving operations by the driver, as triggered by occurrence of switching in driving of the vehicle from the automatic driving mode to the manual driving mode; a determination processor that determines from the feature amounts of the driving operations by the driver acquired by the information receiver, a driving operation to be corrected in the automatic driving mode and a correction amount thereof; a storage that stores the driving operation to be corrected and the correction amount thereof that are determined by the determination processor, in a manner associated with their corresponding position information; a correction processor that corrects a driving operation in the automatic driving mode, using the driving operation to be corrected and the correction amount thereof that are read out from the storage; and a vehicle controller that controls the vehicle in the automatic driving mode using the driving operation corrected by the correction processor.

Effect of the Invention

According to the invention, there is provided an effect that it is possible to make correction in automatic driving in a manner matched to the driver, while reducing the memory usage and the processing load.

BRIEF DESCRIPTION OF THE DRAWINGS

FIG. 5 is a diagram schematically showing an automatic driving section and a manual driving section in a straight road.

FIG. 6 is a diagram showing an example of feature information of driving operations.

FIG. 7 is a flowchart of correction processing with respect to a driving operation in the automatic driving mode according to Embodiment 1.

MODES FOR CARRYING OUT THE INVENTION

Hereinafter, for illustrating the invention in more detail, embodiments for carrying out the invention will be described according to the accompanying drawings.

Embodiment 1

Figure 1:
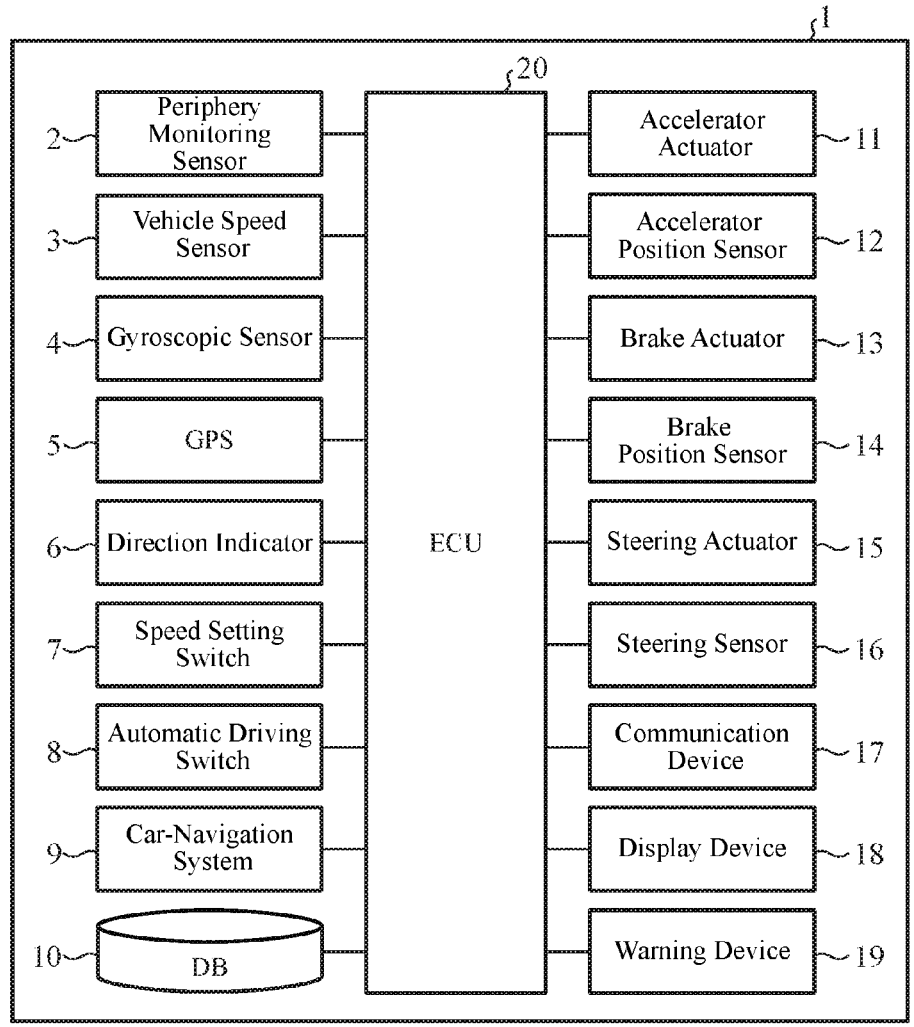
FIG. 1 is a block diagram showing a configuration of a driving assistance device according to the invention.
Figure 2:
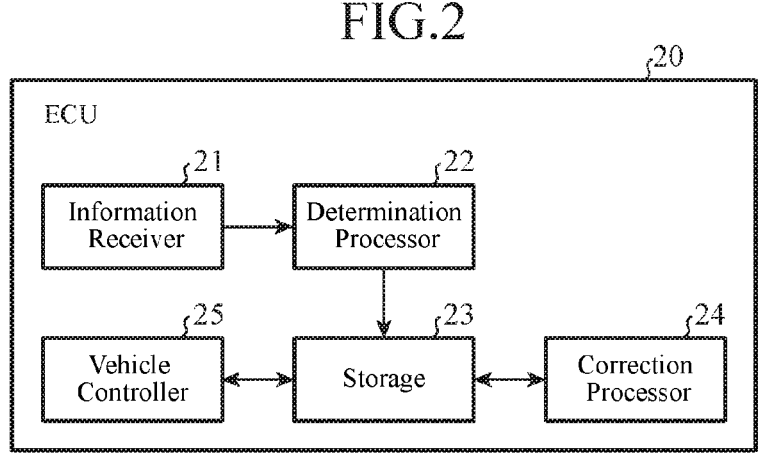
FIG. 2 is a block diagram showing a configuration of an ECU that serves as a driving assistance device according to Embodiment 1.

FIG. 1 is a block diagram showing a configuration of a driving assistance device according to the invention. FIG. 2 is a block diagram showing a configuration of an ECU that serves as a driving assistance device according to Embodiment 1.

In FIG. 1, a driving assistance system 1 is a system which is installed in a vehicle and assists driving of the vehicle using switching between an automatic driving mode and a manual driving mode by a driver.

As configurations thereof, it includes a periphery monitoring sensor 2, a vehicle speed sensor 3, a gyroscopic sensor 4, a GPS (Global Positioning System) receiver 5, a direction indicator 6, a speed setting switch 7, an automatic driving switch 8, a car-navigation system 9, a map information database (DB) 10, an accelerator actuator 11, an accelerator position sensor 12, a brake actuator 13, a brake position sensor 14, a steering actuator 15, a steering sensor 16, a communication device 17, a display device 18, a warning device 19 and an ECU (Electronic Control Unit) 20.

Note that, in FIG. 1, for simplification of description, only the configuration elements directly related to this embodiment are illustrated, and thus the other configuration elements are omitted from illustration.

The periphery monitoring sensor 2 is a sensor for detecting a peripheral condition of the vehicle. For example, it is implemented by a camera or a millimeter-wave sensor and acquires presence/absence of an obstacle placed in the periphery including the front side, right-left sides and rear side of a host vehicle, a distance from the obstacle to the host vehicle, a relative speed of the obstacle with respect to the host vehicle, and the like. The vehicle speed sensor 3 is a sensor for measuring the speed of the host vehicle. For example, it detects a revolution speed of the wheel and measures from the revolution speed, the vehicle speed of the host vehicle. Further, the gyroscopic sensor 4 is a sensor for detecting a change in direction of the host vehicle. For example, it detects an angular rate of the host vehicle and detects from the angular rate, a change in the direction. The GPS receiver 5 performs position determination about the current position of the host vehicle on the basis of a GPS signal received from a GPS satellite.

The direction indicator 6 indicates a change in traveling direction of the host vehicle. For example, it indicates on the periphery, the traveling direction of the host vehicle at the time of a right/left turn or a lane change, using a blinking state of an indicating lamp placed on an outside of the vehicle. The blinking state of the indicating lamp is transmitted to the ECU 20.

The speed setting switch 7 is a switch used for setting a speed of the vehicle. For example, it is used in the vehicle having a function of causing the vehicle to travel with keeping a speed set by the speed setting switch 7 while detecting a preceding vehicle, as exemplified by an automatic driving mode or an ACC (Adaptive Cruise Control) mode. Note that the speed set by the speed setting switch 7 is transmitted to the ECU 20.

The automatic driving switch 8 accepts a setting as to whether to place the host vehicle in the automatic driving mode or in the manual driving mode. Information as to whether the host vehicle is in the automatic driving mode or in the manual driving mode is transmitted to the ECU 20.

The car-navigation system 9 has a function to perform route guidance for the host vehicle up to a predetermined destination point. Further, the car-navigation system 9, upon cooperation with the GPS receiver 5, the communication device 17, the display device 18, the warning device 19, the map DB 10 and the ECU 20, presents to the driver, map information around a current place of the host vehicle, the current position of the host vehicle, the position of the destination point, the route up to the destination point, and the like. The map DB 10 is a database in which map data are recorded, and includes a map data file, an intersection data file, a road data file and the like.

The accelerator actuator 11 performs acceleration/deceleration of the vehicle according to a position of the accelerator pedal or a signal from the ECU 20. The accelerator position sensor 12 is a sensor for detecting an operation amount of the accelerator pedal, and transmits a signal indicative of the detected operation amount to the ECU 20.

The brake actuator 13 performs deceleration of the vehicle according to a position of the brake or a signal from the ECU 20. The brake position sensor 14 is a sensor for detecting an operation amount of the brake pedal (pressed-down amount of the brake pedal). The steering actuator 15 performs controlling of the traveling direction of the vehicle according to a steered amount of the steering wheel and its steering direction. The steering sensor 16 is a sensor for detecting the steered amount of the steering wheel and the steering direction, and transmits signals indicative of the detected steered amount and steering direction to the ECU 20.

The communication device 17 is a communication device for acquiring information from a traffic infrastructure or the like, such as an optical vehicle detector (so-called optical beacon), placed on the road. Examples of information to be acquired include, information related to a peripheral condition with poor visibility, traffic control information (for example, information related to a traffic light, a sign or the like), and information related to a road condition (for example, information of a traffic accident, a traffic jam or the like).

Further, examples of the communication device 17 also include a communication device that performs a vehicle-to-vehicle communication to be established with another vehicle or performs communication through a mobile telephone, etc.

The display device 18 is a display device for displaying a variety of information. For example, it displays navigation information in conjunction with the car-navigation system 9. Further, it displays information related to control timing or content of a controlled operation of the host vehicle. The warning device 19 is a device for outputting a warning. For example, it outputs a warning in conjunction with the car-navigation system 9. Further, it outputs a warning according to the control timing or the content of a controlled operation of the host vehicle.

The ECU 20 is an ECU that performs controlling of the entire driving assistance system 1. For example, it is provided mainly with a CPU and includes a ROM, a RAM, an input signal circuit, an output signal circuit, a power supply circuit, and the like.

Further, as shown in FIG. 2, the ECU 20 includes as a functional configuration of the driving assistance device according to Embodiment 1, an information receiver 21, a determination processor 22, a storage 23, a correction processor 24 and a vehicle controller 25.

The information receiver 21 acquires respective position information of the vehicle and driving operations by the driver, as triggered by occurrence of switching in driving of the vehicle from the automatic driving mode to the manual driving mode. For example, it acquires a current position of the vehicle measured by the GPS receiver 5, as position information of the vehicle. Further, the driving operations by the driver is each identified based, for example, on a traveling direction of the vehicle inputted from the direction indicator 6, an operation amount of the accelerator pedal detected by the accelerator position sensor 12, a pressed-down amount of the brake pedal detected by the brake position sensor 14, or a steered amount of the steering wheel and/or an operation amount about a steering direction, etc. that are detected by the steering sensor 16.

The determination processor 22 determines from the feature amounts of the driving operations by the driver acquired by the information receiver 21, a driving operation to be corrected in the automatic driving mode and a correction amount thereof.

For example, at a current position of the vehicle, when there is a difference by a predetermined threshold value or more, between a vehicle speed set for the automatic driving mode and a vehicle speed (feature amount) in the manual driving mode, the driving operation thereat is determined to be corrected, and the vehicle speed in the manual driving mode is determined as the correction amount for the automatic driving mode.

The storage 23 is a storage that stores the driving operation to be corrected in the automatic driving mode and the correction amount thereof that are determined by the determination processor 22, in a manner associated with their corresponding position information. For example, it is established in a storage region of a non-volatile memory provided with the ECU 20 to be read out appropriately by the correction processor 24 and the vehicle controller 25.

The correction processor 24 is a correction processor that, using the driving operation to be corrected and the correction amount thereof that are read out from the storage 23, corrects a driving operation corresponding to the position information in the automatic driving mode.

For example, when an object to be corrected corresponding to a current position of the vehicle is a vehicle speed, the vehicle speed set for the automatic driving mode is corrected with the correction amount for the vehicle speed read out from the storage 23.

The vehicle controller 25 controls driving of the vehicle using switching between the automatic driving mode and the manual driving mode. For example, it controls the position of the accelerator pedal in the accelerator actuator 11 according to a driving operation set in the automatic driving mode to thereby accelerate or decelerate the vehicle. Further, it controls the brake position in the brake actuator 13 according to a driving operation set in the automatic driving mode to thereby decelerate the vehicle. Or, it controls a steered amount and a steering direction of the steering wheel in the steering actuator 15.

Note that the information receiver 21, the determination processor 22, the storage 23, the correction processor 24 and the vehicle controller 25, that are described above, can be implemented as software-hardware cooperation measures in such a manner that, for example, a CPU of the ECU 20 executes the programs in which the processing specific to Embodiment 1 is written.

Meanwhile, the driving assistance system 1 may use, as the automatic driving mode, for example, a driving mode having a cruise-control function in which the vehicle is caused to travel at a speed set by the driver.

Further, it may use, as the automatic driving mode, a driving mode having an ACC-function in which, upon recognition of the peripheral condition of the vehicle, the vehicle speed is set so as not to collide with an obstacle.

Furthermore, the automatic driving mode may be a driving mode having an automatic driving function in which, upon receiving map information corresponding to the host-vehicle position, road-to-vehicle information, vehicle-to-vehicle information and the like, a route is set, so that all of the speed of the vehicle and the steered amount and steering direction of the steering wheel are controlled.

Next, operations will be described.

In the following, description will be made assuming that the automatic driving mode of the driving assistance system 1 is the above described driving mode having an automatic driving function. Note that the automatic driving mode is set by the user operating the automatic driving switch 8. Meanwhile, in the case of making switching to the manual driving mode by the driver, it is allowable that the switching is made through the operation of the automatic driving switch 8, or the switching to the manual driving mode is made automatically in response to a change in the brake position or in the accelerator position.

In response to the switching from the automatic driving mode to the manual driving mode, the driving assistance system 1 inputs respective detection signals, for example, from the accelerator position sensor 12, the brake position sensor 14 and the steering sensor 16, to thereby acquire a variety of feature amounts of the driving operations in the manual driving mode while associating them with respective vehicle positions, on the basis of these detection signals. Among the feature amounts of the driving operations in the manual driving mode, the feature amount having a large difference from the feature amount of the driving operation set for the automatic driving mode is selected to be corrected, and a correction amount for compensating that difference is stored.

Figure 3:
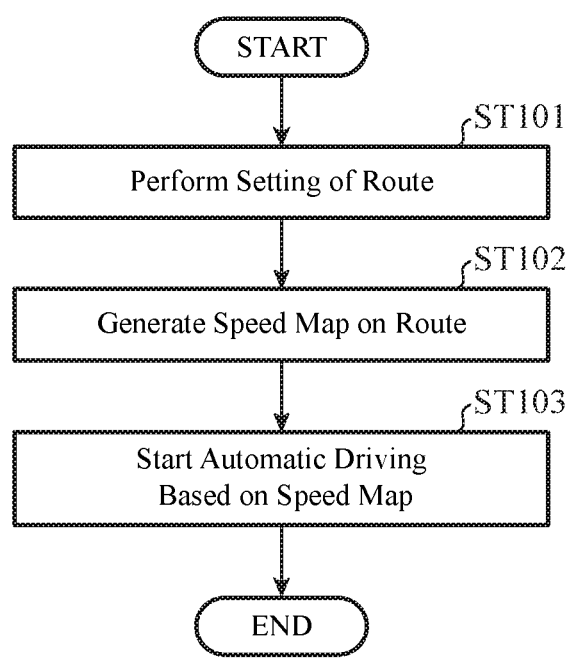
FIG. 3 is a flowchart of processing of setting an automatic driving mode according to Embodiment 1.

FIG. 3 is a flowchart of processing of setting the automatic driving mode according to Embodiment 1.

The driver inputs a destination point to the car-navigation system 9. This causes the car-navigation system 9 to set a route up to the input destination point on the basis of the map data stored in the map DB 10 (Step ST101).

After completion of setting the route, the car-navigation system 9 reads out road data corresponding to the route from the map DB 10, and generates a speed map on the route on the basis of: limited-speed information, intersection information and curve information of the road on the route; road-to-vehicle information or weather information that can be acquired by the communication device 17; and the like (Step ST102). Note that the speed map is information in which speed change points on the route are written. In the automatic driving mode, the speed of the vehicle is so controlled as to become a speed set at each of the speed change points.

Thereafter, when the driver presses down the automatic driving switch 8, the driving mode of the vehicle is switched to the automatic driving mode, so that automatic driving is started (Step ST103).

Figure 4:
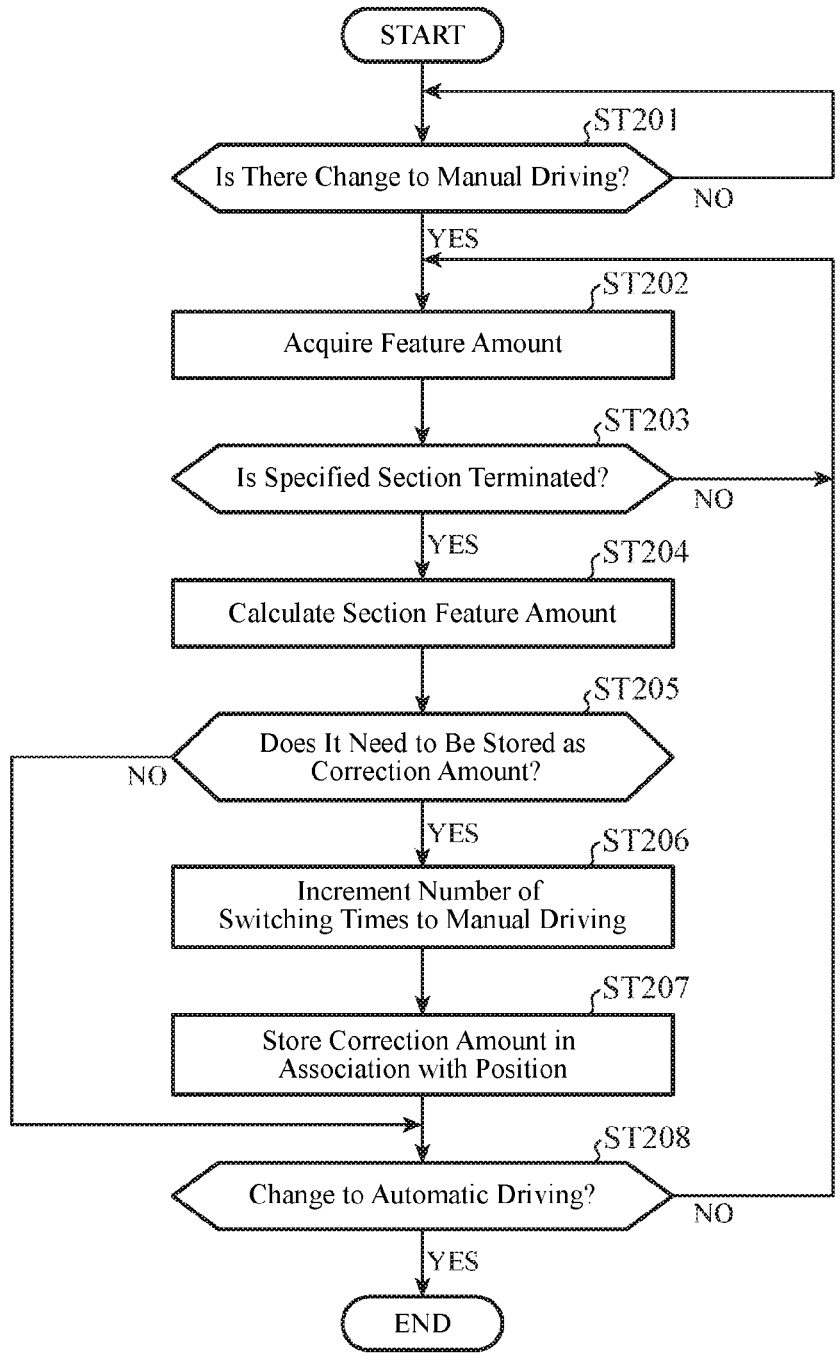
FIG. 4 is a flowchart of processing of storing an object to be corrected in the automatic driving mode and its correction amount, according to Embodiment 1.

FIG. 4 is a flowchart of processing of storing an object to be corrected in the automatic driving mode and its correction amount, according to Embodiment 1. Further, FIG. 5 is a diagram schematically showing an automatic driving section and a manual driving section in a straight road. As shown in FIG. 5, a case is cited as an example where the vehicle 100 is traveling by the automatic driving on the straight road and, even though the driver wants to continue the automatic driving, there arises a need to switch the driving temporarily to the manual driving.

On this occasion, it is supposed that, due to the reason that the traveling road (straight road) is a bad road, the road is narrow, the limited speed has been changed, or likewise, the speed set in the automatic driving mode becomes away from a required value by the driver, so that the driver makes switching to the manual driving. For example, the driving operation in the automatic driving section A shown in FIG. 5 is not matched to the driver's desire, so that the driver suspends the automatic driving and starts the manual driving from the manual driving section.

Correction in the automatic driving is executed in the manual driving section as shown in FIG. 5.

The information receiver 21 confirms whether or not the vehicle 100 is changed (switched) from the automatic driving mode to the manual driving mode, on the basis of the operation signal of the automatic driving switch 8 or the like (Step ST201). If not changed to the manual driving mode (Step ST201; NO), the flow returns to processing in Step ST201, so that the above determination processing is repeated.

If the vehicle 100 is changed to the manual driving mode (Step ST201; YES), the information receiver 21 acquires a variety of feature amounts of the driving operations in the manual driving mode (Step ST202). Note that the feature amount is an operation amount of each of the driving operations in a series of vehicle controls by the driver. Examples thereof include a speed, a deceleration rate and an acceleration rate of the vehicle 100, a steered amount and a steering direction of the steering wheel, and the like, that are periodically acquired in the manual driving section.

Subsequently, the information receiver 21 confirms whether or not a specified section is terminated (Step ST203). Namely, the feature amounts are acquired continuously in the specified section.

For example, by regarding the entire manual driving section as one specified section, the feature amounts may be acquired continuously therein. Instead, by dividing the manual driving section into plural specified sections, the feature amounts may be acquired in every specified section.

For example, the specified section is set for each of time points at which the speed of the vehicle 100 becomes maximum or minimum, at which the deceleration or the acceleration effected on the vehicle 100 becomes maximum, and/or at which the steering wheel is turned.

Instead, the specified section may be set in a time division manner. Besides, the specified section may be defined for each of distances set in the route on the map, to thereby acquire the feature amounts in each specified section. When there is the speed map, the specified section may be set for each of the speed change points on the route.

When the specified section is not terminated (Step ST203; NO), the flow returns to Step ST202 to continue acquiring the feature amounts.

In contrast, when the specified section is terminated (Step ST203; YES), the information receiver 21 calculates a section feature amount (Step ST204). The section feature amount is a summarized feature amount for each specified section that is obtained from the plural feature amounts acquired in that specified section. For example, a moving average value of the plural feature amounts acquired in the specified section is determined as the section feature amount.

In this manner, all of the feature amounts are not kept stored, but the feature amounts in the specified section are subjected to moving-averaging or the like, so that they are stored in a manner summarized as the section feature amount. This makes it possible to reduce the memory usage.

Then, the determination processor 22 determines based on the section feature amount calculated by the information receiver 21, whether or not the feature amount needs to be stored as the correction amount in the storage 23 (Step ST205).

For example, upon comparison between the section feature amount and a feature amount of the driving operation in the above section having been set in the automatic driving mode, when a difference therebetween exceeds a predetermined threshold value, such setting in the automatic driving mode in that section is determined to be unmatched to the driver's desire, so that the section feature amount is stored as the correction amount.

Meanwhile, it is allowable that the information receiver 21 further acquires a peripheral condition of the vehicle 100, and that the determination processor 22 determines based on the peripheral condition of the vehicle 100, a feature amount to be used as the correction amount, from the feature amounts of the driving operations in the manual driving mode.

For example, FIG. 6 is a diagram showing an example of feature information of driving operations. In FIG. 6, driving information is information for specifying respective driving operations, and includes an acceleration operation, a deceleration operation, a steering operation, and the like. The respective driving operations specified by the driving information are each identified by the feature amount corresponding to that operation. For example, for the acceleration operation, an acceleration rate of the vehicle 100 obtained from that operation is the feature amount and, for the steering operation, the steered amount and steering direction obtained from that operation are the feature amounts.

In the example of FIG. 6, in addition to the feature amounts of the driving operations as the driving information, the information receiver 21 acquires, as the information showing the peripheral condition of the vehicle 100, spot information showing features of the traveling road of the vehicle 100, and periphery information showing relationships between the vehicle 100 and the surrounding other vehicles.

For the spot information and the periphery information, their conceivable contents are set beforehand as shown in FIG. 6, and a number "1" is given to the content matched to the current position of the vehicle 100. The example of FIG. 6 shows the case where the vehicle 100 is traveling in the manual driving section shown in FIG. 5, so that "1" is given to "Straight Road" in the spot information.

In this manner, during the manual driving of the vehicle 100, the information receiver 21 acquires the feature amounts of the driving operations as the driving information and, for the spot information and the periphery information, gives "1" to their content matched to the position of the vehicle 100. The determination processor 22 combines the contents to which the number "1" is given, to thereby determine the peripheral condition of the vehicle. At this time, if any of the following events that never take place in the normal manual driving occurs around the vehicle 100, the feature amount related to the driving information is not stored as the correction amount.

For example, in the case where "1" is given to "Preceding Vehicle Exists" in the periphery information shown in FIG. 6 and thus the vehicle 100 is determined to follow the preceding vehicle, this follow-up traveling is not an event that occurs always at the current position of the vehicle 100. Thus, the feature amount of the driving operation obtained in this case is not stored as the correction amount. Further, also in the case where, in the periphery information, "1" is given to "Preceding Vehicle Exists" but "Oncoming vehicle Exists" is "0" without change, and in addition, the vehicle 100 is determined to have overtaken the preceding vehicle because its speed is higher than the speed of the preceding vehicle, this is not an event that occurs always at the current position of the vehicle 100. Thus, the feature amount of the driving operation obtained in this case is not stored as the correction amount.

Furthermore, also in the case of performing acceleration/deceleration in order to change the route toward an initially-set destination point to another route, the feature amount of the driving operation obtained in this case is not stored as the correction amount.

Further, also in the case where, even though "1" is given to "Straight Road" in the spot information and thus the traveling road is a straight road, a steering operation is largely performed, it is determined that an abnormal event, such as to avoid an obstacle, has occurred in the vehicle 100, so that the feature amount of the driving operation obtained in this case is not stored as the correction amount. In such a manner, a feature amount of the driving operation performed by the driver in response to a temporary event is not stored as the correction amount, so that the memory usage can be further reduced.

When it is determined that the feature amount has not to be stored as the correction amount in the storage 23 (Step ST205; NO), the vehicle controller 25 moves its processing to Step ST208.

Meanwhile, when it is determined that the feature amount needs to be stored as the correction amount (Step ST205; YES), the determination processor 22 adds +1 to the number of times switched to the manual driving, and stores it in the storage 23 (Step ST206). The number of times switched to the manual driving is the number of times switched to the manual driving in the same traveling route, and corresponds to the number of times the correction would have been necessary in the automatic driving in the route.

As a value that indicates how positively the driver has used the automatic driving, the correction processor 24 calculates an automatic-driving travel frequency about the automatic driving set in the past for the same traveling route. This makes it possible when the number of times switched to the manual driving is significantly larger relative to the automatic-driving travel frequency of traveling in the automatic driving on the same route, to calculate an automatic-driving dis-satisfaction degree of the driver in the corresponding traveling portion.

Then, the storage 23 stores the correction amount determined by the determination processor 22 in a manner associated with the position information or the speed map of the vehicle 100 (Step ST207).

At this time, the correction amount may be stored for every traveling direction of the vehicle 100. Namely, the determination processor 22 determines the driving operation to be corrected in the automatic driving mode and the correction amount thereof, for every traveling direction of the vehicle 100, on the basis of the feature amounts of the driving operations by the driver acquired by the information receiver 21. Then, the storage 23 may store the driving operation to be corrected in the automatic driving mode and the correction amount thereof in a manner associated with their corresponding position information and traveling direction of the vehicle 100. For example, different correction amounts are stored for the forward travel and the return travel, respectively.

This makes it possible to obtain a correction amount matched to an actual traveling condition, to thereby perform the automatic driving matched to the driver's desire.

In Step ST208, the vehicle controller 25 inquires the driver about whether or not to change the driving mode of the vehicle 100 from the manual driving mode to the automatic driving mode. When the manual driving is to be continued (Step ST208; NO), the flow returns to processing in Step ST202, so that the above processing is repeated. Meanwhile, in the case of switching to the automatic driving (Step ST208; YES), acquisition and storing of the correction amounts are terminated. However, in the case of traveling a predetermined interval or more from the position at which the automatic driving (automatic driving section A) has been switched to the manual driving (manual driving section), it is highly likely due to just the lack of setting to the automatic driving. Thus, when the above condition is met, storing of the correction amount may be suspended.

Note that, in the aforementioned processing, the correction amount stored due to switching once to the manual driving is utilized for correction in the next automatic driving on the same route. Thus, there is also a possibility that a feature amount of the driving operation in the manual driving in response to an event having occurred temporarily is used as the correction amount, so that correction is made in the automatic driving with a driving operation not intended by the driver. Thus, the operation amounts of the respective driving operations set in the speed map for the automatic driving may be subject to weighting in a certain way, to thereby correct the weighted operation amount with the correction amount.

For example, in the case where, although the vehicle speed in the automatic driving is set to 40 km/h, the vehicle travels at the corresponding vehicle position in the manual driving at 35 km/h, the correction amount is given as an amount which is resulted from multiplying −5 km/h, a difference between both of them, by a weight w. When w is 0.5, this results in the correction amount of −2.5 km/h, so that 37.5 km/h is set at the next traveling by the automatic driving.

Further, although the aforementioned weight w may be a constant value, it may be calculated using the automatic-driving dissatisfaction degree. Namely, in the case where switching to the manual driving has repeatedly occurred in the automatic driving performed on the same route, it is supposed that the driver has dissatisfaction with the setting of the automatic driving.

Thus, using the number of traveling times N on the same traveling route and the number of switching times AN switched from the automatic driving to the manual driving in that traveling times, an automatic-driving dissatisfaction degree Ns is calculated by the following formula (1).

Then, when the initial amount of the weight w is 0.5, weighting is performed further using the automatic-driving dissatisfaction degree Ns, by the following formula (2).

$$\text{Automatic-Driving Dissatisfaction Degree } Ns = \text{Number of Switching Times } AN/\text{Number of Traveling Times } N \quad (1)$$

$$w = 0.5 \times \text{Automatic-Driving Dissatisfaction Degree } Ns \quad (2)$$

For example, it is assumed that the number of traveling times N on the same traveling route is 10, and switching to the manual driving has occurred in ten automatic driving times. In this case, if the number of switching times AN to the manual driving is 1, the automatic-driving dissatisfaction degree Ns becomes 0.1 and the weight w becomes 0.05.

Meanwhile, at the first time of passing through a certain traveling route by the automatic driving, if switching to the manual driving has occurred, because the number of traveling times N=1 and the number of switching times AN=1, the automatic-driving dissatisfaction degree Ns becomes 1. Accordingly, the weight w becomes 0.5.

Furthermore, in the ten automatic driving times, if switching to the manual driving has occurred five times, because the number of traveling times N=10 and the number of switching times AN=5, the automatic-driving dissatisfaction degree Ns becomes 5/10=0.5, and the weight w becomes 0.25. When the dissatisfaction against the automatic driving is quantified and reflected in the correction amount in such a manner, it is possible to perform correction matched to the driver's intention.

Next, description will be made about correction processing for the automatic driving.

FIG. 7 is a flowchart of the correction processing with respect to a driving operation in the automatic driving mode according to Embodiment 1. First, when the destination point is inputted, like in FIG. 3, the car-navigation system 9 sets a route up to the destination point on the basis of the map data stored in the map DB 10 (Step ST301). After completion of setting the route, the car-navigation system 9 reads out road data corresponding to the route from the map DB 10, and generates a speed map on the route on the basis of: limited-speed information, intersection information and curve information of the road on the route; road-to-vehicle information or weather information that can be acquired by the communication device 17; and the like (Step ST302).

Then, the correction processor 24 in the ECU 20 searches data related to routes for which the speed maps have been generated, from among data stored in the storage 23, to thereby determine whether or not: the route is that on which the vehicle 100 has previously traveled; and a correction amount for the automatic driving is being stored (Step ST303). At this time, if not previously traveled on the setup route (Step ST303; NO), the flow moves to processing in Step ST309.

If previously traveled on the setup route, and there is a correction amount for the automatic driving (Step ST303; YES), the correction processor 24 confirms whether or not the number of switching times AN to the manual driving in an objective section exceeds a predetermined threshold value (Step ST304).

If the number of switching times AN to the manual driving is the predetermined threshold value or less (Step ST304; NO), the flow moves to processing in Step ST307.

If the number of switching times AN to the manual driving exceeds the predetermined threshold value (Step ST304; YES), the correction processor 24 corrects the driving operation set in the speed map, with the correction amount for the automatic driving (Step ST305).

Then, based on the vehicle speed set at a place subjected to correction this time in the speed map, and a vehicle speed set at a place next to that place, the correction processor 24 calculates an acceleration rate or deceleration rate between both of the places (Step ST306).

Subsequently, the correction processor 24 determines respectively whether or not the calculated acceleration rate exceeds an acceleration-related driver's acceptable value (threshold value) and whether or not the calculated deceleration rate exceeds a deceleration-related driver's acceptable value (threshold value) (Step ST307).

If the calculated acceleration rate is the above threshold value or less (Step ST307; NO), the flow returns to processing in Step ST303, so that the above processing is repeated.

In contrast, if the calculated acceleration rate exceeds the above threshold value (Step ST307; YES), the correction processor 24 modifies the correction amount for the vehicle speed set at the place next to the place subjected to correction this time so that the acceleration rate becomes the above threshold value or less (Step ST308).

Because it is not necessary that the speed must reach the setup speed at the next place in a forcible manner, the correction amount is modified so that acceleration is caused in a range without giving an uncomfortable feeling to the driver.

Namely, the correction processor 24 modifies the correction amount at the next place so that, during changing to the vehicle speed after correction at the next place, an amount of change per unit time becomes a predetermined value or less, to thereby reduce the vehicle speed after correction.

If the calculated deceleration rate exceeds the above threshold value (Step ST307; YES), the correction processor 24 modifies the correction amount for the vehicle speed set at the place next to the place subjected to correction this time so that the deceleration rate becomes the threshold value or less (Step ST308). For example, in the case where there is a curve at the end of a straight road and the deceleration rate is large until the vehicle speed reaches the speed set at the next place, sudden braking is likely to occur in order to drop the vehicle speed.

Thus, the correction processor 24 modifies the correction amount so that deceleration is caused in a range without giving an uncomfortable feeling to the driver. Namely, the correction processor 24 modifies the correction amount at the next place so that, during changing to the vehicle speed after correction at the next place, an amount of change per unit time becomes a predetermined value or less, to thereby increase the vehicle speed after correction.

Note that, because the acceleration rate is to be considered, the correction in the speed map is performed from the destination-point side. Namely, on the traveling route, a place subjected to correction this time is located toward the destination point and a place next to that place is located toward the departure point.

After completion of the above correction for all places on the route in the speed map, the vehicle controller 25 will start the automatic driving of the vehicle 100 on the basis of the speed map (Step ST309).

This makes it possible at the next traveling on the same route, to perform speed setting matched to the driver's preference.

The aforementioned correction is performed together with the route setting. Thus, when re-routed, for example, the correction will be performed for the new route using the aforementioned series of processing.

With respect to the correction amount stored in the storage 23, it is allowable to design so that the driver can confirm its content and delete it, as appropriate. For example, an input device accepts a request for confirmation of the correction content or for deletion. The information receiver 21 in the ECU 20 reads out from the storage 23, the correction amount corresponding to the request accepted by the input device, and displays it on the display device 18 or deletes it from the storage 23.

Meanwhile, in the driving assistance system 1, driving assistance may be performed separately for each of the drivers in such a manner that the driver is identified beforehand. On this occasion, for example, driving assistance may be separately set only in a portion where a portion in which the feature of a driver A is reflected and a portion in which the feature of a driver B is reflected are conflicted to each other, to thereby reflect the other driver's correction amount one another. Instead, driving assistance may be separately set entirely for both of the drivers.

Figure 8:
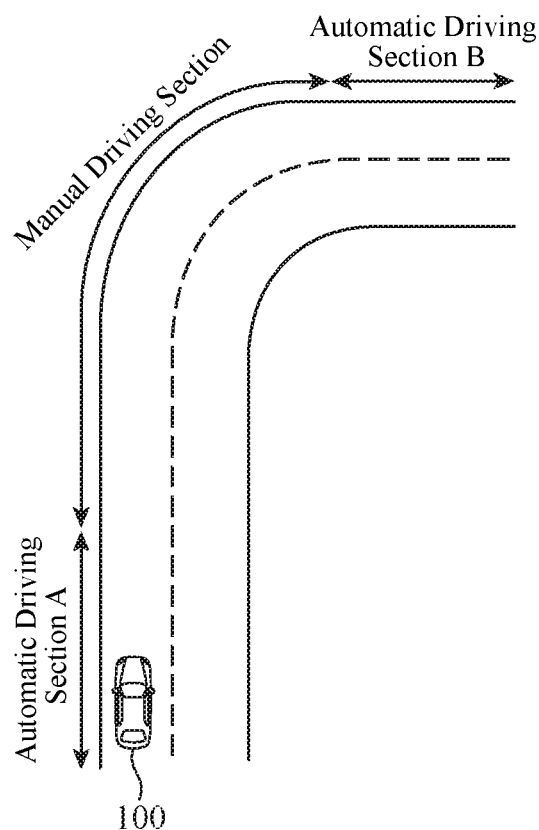
FIG. 8 is a diagram schematically showing an automatic driving section and a manual driving section in a road including a curve.

FIG. 8 is a diagram schematically showing an automatic driving section and a manual driving section in a road including a curve.

In the case of the vehicle 100 traveling the curve by the automatic driving, generally, matching between the map data and the vehicle position is performed, and the curve is recognized using the detection data of the periphery monitoring sensor 2 or the road-to-vehicle communication by the communication device 17, so that the speed and the steering amount of the vehicle 100 in the curve are optimized.

However, when the entry speed to the curve is determined only depending on the information recognized in the vehicle 100 side, there is a possibility that the speed is set to a speed not matched to the driver's preference. For example, an event in which the lane is narrow, the visibility beyond the curve is poor, or likewise, is not reflected, so that the vehicle speed faster than that by the intention of the driver is set. On this occasion, the driver will be highly likely to make switching to the manual driving at the time of entering the same curve.

Thus, in the driving assistance system 1, in order to solve the aforementioned trouble, the feature amounts of the driving operations are acquired as triggered by the switching to the manual driving, and the correction amount is determined from among the feature amounts.

For example, in the case where the driver performs the manual driving at the time of the vehicle 100 entering the curve, the following emerge as features in the driving operations: switching to the manual driving and deceleration, before entering the curve; a steered amount, during traveling on the curve; and acceleration or switching to the automatic driving, at the time of departure from the curve. Based on these features, the section feature amount is calculated, and from the section feature amount, the correction amount is obtained to be thus reflected in the automatic driving.

Meanwhile, even in the case of an intersection, when the entry speed to the intersection is determined only depending on the information recognized in the vehicle 100 side, there is a possibility that the speed is set to a speed not matched to the driver's preference.

For example, at an intersection, features in the driving operations differ depending on the signal information. In the case where the driver performs the manual driving at the time of the vehicle 100 entering the intersection, if the green light is on, like in the case of the curve, the following emerge as features in the driving operations: switching to the manual driving and deceleration, before entering the intersection; a steered amount, during traveling in the intersection; and acceleration or switching to the automatic driving, at the time of departure from the intersection.

However, in the case of making acceleration at the time of switching to the yellow light, the feature amount in the driving operation obtained at that time is not stored as the correction amount, because the automatic driving is based on the assumption of the blue light.

As described above, according to Embodiment 1, the respective position information of the vehicle 100 and the feature amounts of driving operations by the driver are acquired as triggered by occurrence of switching in driving of the vehicle 100 from the automatic driving mode to the manual driving mode, and a driving operation to be corrected in the automatic driving mode and the correction amount thereof are determined from the acquired feature amounts of the driving operations by the driver. Then, the thus-determined driving operation to be corrected and correction amount thereof are stored in a manner associated with their corresponding position information, so that a driving operation in the automatic driving mode is corrected using the driving operation to be corrected and the correction amount thereof, to thereby control the vehicle 100 using the driving operation corrected in the automatic driving mode.

In this manner, the position information of the vehicle 100 and the feature amounts of the driving operations by the driver are acquired as triggered by occurrence of switching from the automatic driving mode to the manual driving mode, so that it is possible to reduce the memory usage and the processing load. Further, the driving operation to be corrected in the automatic driving mode and the correction amount thereof are determined based on the feature amounts of the driving operations by the driver, so that it is possible to correct the driving operation in the automatic driving to be matched to the driver's desire.

Further, according to Embodiment 1, the traveling directions of the vehicle 100 are further acquired, so that the driving operation to be corrected in the automatic driving mode and the correction amount thereof are determined for each of the traveling directions of the vehicle 100, on the basis of the feature amounts of the driving operations by the driver. Then, the determined driving operation to be corrected and correction amount thereof are stored in a manner associated with their corresponding position information and traveling direction of the vehicle, so that a driving operation in the automatic driving mode corresponding to the position information and the traveling direction of the vehicle 100 is corrected using the driving operation to be corrected and the correction amount thereof. This makes it possible to obtain a correction amount matched to an actual traveling condition, to thereby perform the automatic driving matched to the driver's desire.

Furthermore, according to Embodiment 1, the peripheral condition of the vehicle 100 is further acquired, so that the feature amount given as the correction amount of the driving operation to be corrected is determined from the feature amounts of the driving operations by the driver, on the basis of the peripheral condition of the vehicle 100. This makes it possible to further reduce the memory usage by not storing, as the correction amount, the feature amount of the driving operation performed by the driver in response to a temporary event.

Furthermore, according to Embodiment 1, the correction is made so that, during a vehicle state changing to the state after correction, an amount of change per unit time becomes a predetermined value or less. Thus, it is possible to prevent sudden acceleration or sudden deceleration from occurring at the place where the driving operation has been corrected.

Moreover, according to Embodiment 1, the number of times switched from the automatic driving mode to the manual driving mode relative to the number of times traveled on the same route, is calculated as the degree of dissatisfaction against the automatic driving mode, and the correction amount is weighted by the degree of dissatisfaction. When the dissatisfaction against the automatic driving is quantified and reflected in the correction amount in such a manner, it is possible to perform correction matched to the driver's intention.

Embodiment 2

Figure 9:
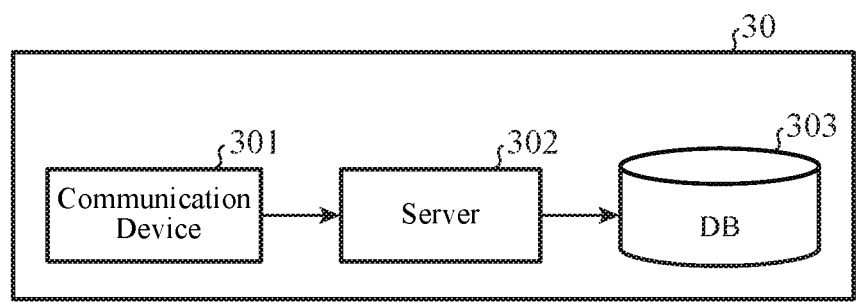
FIG. 9 is a diagram showing a server in a driving assistance system according to Embodiment 2 of the invention.

FIG. 9 is a diagram showing a server in a driving assistance system according to Embodiment 2 of the invention. As shown in FIG. 9, the driving assistance system according to Embodiment 2 includes, in addition to a driving assistance device installed in the vehicle 100, a communication device 301, a server 302 and a database 303 that are placed in a data center 30. The communication device 301 is a communicator that makes communication with the driving assistance device. For example, it is communicably connected through a mobile phone, etc. to the driving assistance device.

The server 302 includes the database (DB) 303 serving as the storage 23 shown in Embodiment 1, and further includes the determination processor 22 and the correction processor 24 shown in Embodiment 1.

Further, the driving assistance device installed in the vehicle 100 includes the information receiver 21 and the vehicle controller 25 shown in Embodiment 1. Note that, upon recording of the map data and the like in the DB 303, the server 302 may perform route search or generation of the speed map.

Next, operations will be described.

Figure 10:
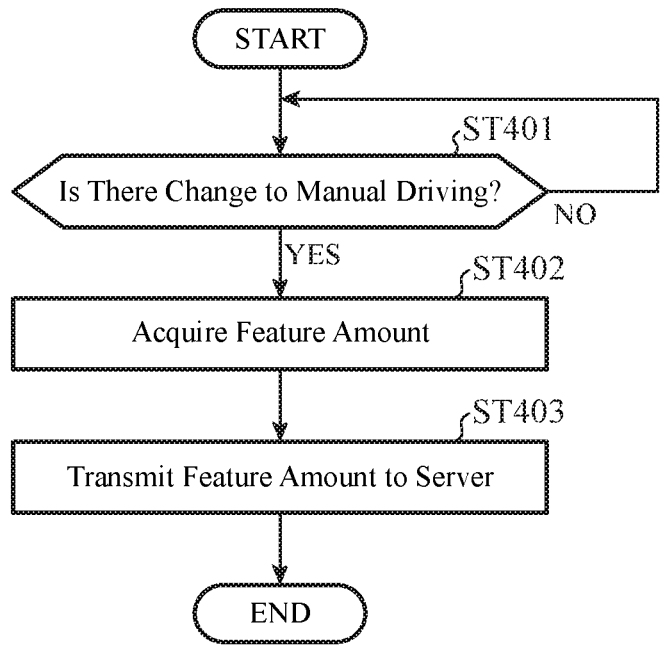
FIG. 10 is a flowchart of processing of acquiring a feature amount in a manual driving mode according to Embodiment 2.

FIG. 10 is a flowchart of processing of acquiring a feature amount in a manual driving mode according to Embodiment 2. The processing in FIG. 10 is executed by the driving assistance device installed in the vehicle 100.

First, like in Embodiment 1, the information receiver 21 confirms whether or not the vehicle 100 is changed from the automatic driving mode to the manual driving mode, on the basis of the operation signal of the automatic driving switch 8 or the like (Step ST401). If not changed to the manual driving mode (Step ST401; NO), the flow returns to processing in Step ST401, so that the above determination processing is repeated.

If the vehicle 100 is changed to the manual driving mode (Step ST401; YES), the information receiver 21 acquires a variety of feature amounts of the driving operations in the manual driving mode (Step ST402). The feature amounts of the driving operations by the driver in the manual driving mode are transmitted from the information receiver 21 through the communication device 17 to the server 302 (Step ST403).

Figure 11:
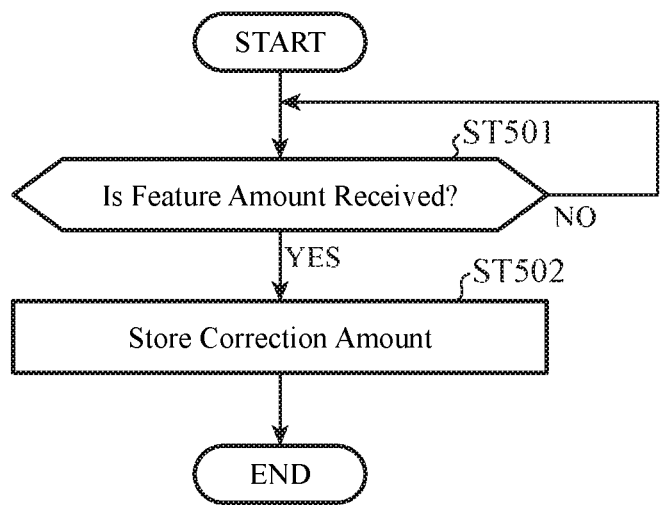
FIG. 11 is a flowchart of processing of storing an object to be corrected in the automatic driving mode and its correction amount, according to Embodiment 2.

FIG. 11 is a flowchart of processing of storing an object to be corrected in the automatic driving mode and its correction amount, according to Embodiment 2. The processing in FIG. 11 is executed by the server 302.

The server 302 determines whether or not it has received the feature amount through the communication device 301 from the vehicle side (Step ST501). If not received the feature amount from the vehicle side (Step ST501; NO), the flow returns to processing in Step ST501, so that the above determination processing is repeated.

If received the feature amount through the communication device 301 from the vehicle side (Step ST501; YES), the determination processor 22 of the server 302 determines whether or not the received feature amount needs to be stored as the correction amount. How to determine the driving operation to be corrected and the correction amount thereof is the same as that in Embodiment 1. The driving operation to be corrected and the correction amount thereof are stored in the DB 303 in a manner associated with their corresponding position information and traveling direction of the vehicle 100 (Step ST502).

Note that, in Embodiment 1, a case has been shown in which, among the feature amounts of the driving operations acquired by the information receiver 21, each feature amount determined by the determination processor 22 is only stored as the correction amount; however, with respect to the storage capacity, the DB 303 has more room than the driving assistance device; thus, it is allowable to give weights, each equivalent to a reflection rate at the time of correction, to the respective feature amounts, and to store them as the correction amounts in the DB 303.

Figure 12:
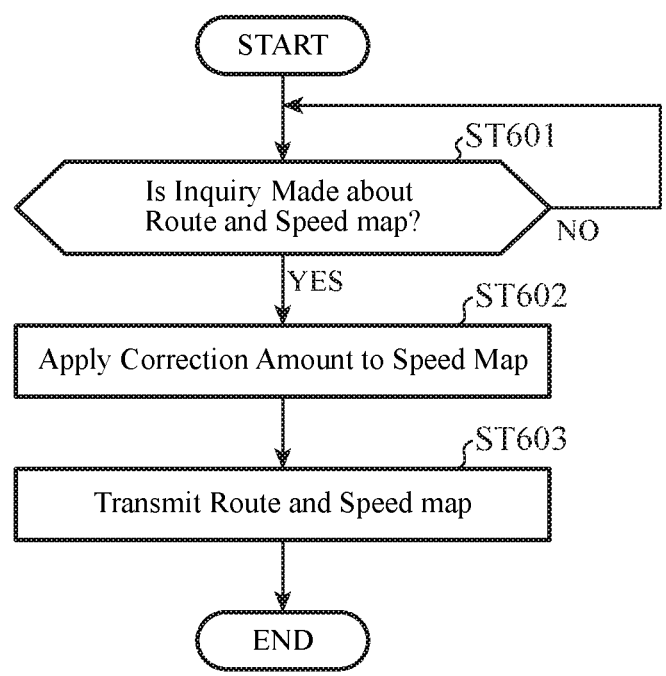
FIG. 12 is a flowchart of correction processing with respect to a driving operation in the automatic driving mode according to Embodiment 2.

FIG. 12 is a flowchart of correction processing with respect to a driving operation in the automatic driving mode according to Embodiment 2. The processing in FIG. 12 is executed by the server 302.

First, the correction processor 24 of the server 302 confirms whether or not an inquiry about a route and a speed map is made from the driving assistance device through the communication device 301 (Step ST601).

If the inquiry is not made (Step ST601; NO), the flow returns to processing in Step ST601, so that the above determination processing is repeated.

If the inquiry is made (Step ST601; YES), the correction processor 24 reads out from the DB 303, the correction amount for the route in the speed map corresponding to the inquiry, and corrects a driving operation in the automatic driving mode set in the speed map, like in FIG. 7 (Step ST602). The speed map and the route having been corrected are transmitted through the communication device 301 to the driving assistance device (Step ST603).

The vehicle controller 25 will start the automatic driving of the vehicle 100 on the basis of the speed map received from the server 302 side (Step ST309).

As described above, according to Embodiment 2, the determination processor 22, the DB 303 serving as the storage 23 and the correction processor 24 are provided in the server 302 that is communicable with the driving assistance device, and the information receiver 21 transmits to the server 302, the acquired position information of the vehicle 100 and feature amounts of the driving operations by the driver, and the vehicle controller 25 controls the vehicle 100 using the driving operation corrected by the correction processor 24 and received from the server 302.

Even with such a configuration, it is possible, like in Embodiment 1, to make correction in the automatic driving in a manner matched to the driver, while reducing the memory usage and the processing load.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The driving assistance device according to the invention can make correction in automatic driving in a manner matched to the driver, while reducing the memory usage and the processing load, and is thus well-suited as a driving assistance device capable of making switching between automatic driving and manual driving.

DESCRIPTION OF REFERENCE NUMERALS AND SIGNS

1: driving assistance device, 2: periphery monitoring sensor, 3: vehicle speed sensor, 4: gyroscopic sensor, 5: GPS receiver, 6: direction indicator, 7: speed setting switch, 8: automatic driving switch, 9: car-navigation system, 10: map information database (DB), 11: accelerator actuator, 12: accelerator pedal sensor, 13: brake actuator, 14: brake pedal sensor, 15: steering actuator, 16: steering sensor, 17: communication device, 18: display device, 19: warning device, 20: ECU, 21: information receiver, 22: determination processor, 23: storage, 24: correction processor, 25: vehicle controller, 30: data center, 100: vehicle, 301: communication device, 302: server, 303: database (DB).

The invention claimed is:

1. A driving assistance device for assisting driving of a vehicle using switching between an automatic driving mode and a manual driving mode by a driver, comprising:
an information receiver that acquires respective position information of the vehicle and feature amounts of driving operations by the driver, as triggered by occurrence of switching in driving of the vehicle from the automatic driving mode to the manual driving mode;
a determination processor that, based on a difference between the feature amounts of the driving operations by the driver and positionally corresponding feature amounts preset in the automatic driving mode exceeding a predetermined threshold, determines from the feature amounts of the driving operations, a driving operation to be corrected in the automatic driving mode and a correction amount thereof;
a storage that stores the driving operation to be corrected and the correction amount thereof that are determined by the determination processor, in a manner associated with their corresponding position information;
a correction processor that corrects a driving operation in the automatic driving mode, using the driving operation to be corrected and the correction amount thereof that are read out from the storage; and
a vehicle controller that controls the vehicle in the automatic driving mode in which the driving operation corrected by the correction processor is included.

2. The driving assistance device of claim 1, wherein:
the information receiver further acquires traveling directions of the vehicle;
the determination processor determines, for each of the traveling directions of the vehicle, the driving operation to be corrected in the automatic driving mode and the correction amount thereof, on the basis of the feature amounts of the driving operations by the driver acquired by the information receiver;
the storage stores the driving operation to be corrected and the correction amount thereof that are determined by the determination processor, in a manner associated with their corresponding position information and traveling direction of the vehicle; and
the correction processor corrects a driving operation in the automatic driving mode corresponding to the position information and the traveling direction of the vehicle, using the driving operation to be corrected and the correction amount that are read out from the storage.

3. The driving assistance device of claim 1, wherein:
the information receiver further acquires a peripheral condition of the vehicle; and
the determination processor determines from the feature amounts of the driving operations by the driver, a feature amount given as the correction amount of the driving operation to be corrected, on the basis of the peripheral condition of the vehicle.

4. The driving assistance device of claim 1, wherein the correction processor corrects so that, during a vehicle state changing to the state after correction, an amount of change per unit time becomes a predetermined value or less.

5. The driving assistance device of claim 1, wherein the correction processor calculates a number of times switched from the automatic driving mode to the manual driving mode relative to a number of times traveled on a same route, as a degree of dissatisfaction against the automatic driving mode, and weights the correction amount by the degree of dissatisfaction.

6. The driving assistance device of claim 1, wherein:
the determination processor, the storage and the correction processor are provided in a server capable of communicating with the driving assistance device;
the information receiver transmits to the server, the received position information of the vehicle and feature amounts of the driving operations by the driver; and
the vehicle controller controls the vehicle with the driving operation corrected by the correction processor that is received from the server.

7. A driving assistance method of assisting driving of a vehicle using switching between an automatic driving mode and a manual driving mode by a driver, said driving assistance method comprising:
acquiring, by an information receiver, respective position information of the vehicle and feature amounts of driving operations by the driver, as triggered by occurrence of switching in driving of the vehicle from the automatic driving mode to the manual driving mode;
based on a difference between the feature amounts of the driving operations by the driver and positionally corresponding feature amounts preset in the automatic driving mode exceeding a predetermined threshold, determining, by a determination processor, from the feature amounts of the driving operations, a driving operation to be corrected in the automatic driving mode and a correction amount thereof;
storing, by a storage, the driving operation to be corrected in the automatic driving mode and the correction amount thereof, in a manner associated with their corresponding position information;

correcting, by a correction processor, a driving operation in the automatic driving mode, using the driving operation to be corrected and the correction amount thereof that are read out from the storage; and controlling, by a vehicle controller, the vehicle in the automatic driving mode in which the driving operation corrected by the correction processor is included.

8. A driving assistance method of assisting driving of a vehicle using switching between an automatic driving mode and a manual driving mode by a driver, said driving assistance method comprising:

acquiring, by an information receiver in a driving assistance device, respective position information of the vehicle and feature amounts of driving operations by the driver, as triggered by occurrence of switching in driving of the vehicle from the automatic driving mode to the manual driving mode, followed by transmitting them to a server;

based on a difference between the feature amounts of the driving operations by the driver and positionally corresponding feature amounts preset in the automatic driving mode exceeding a predetermined threshold, determining, by a determination processor in the server, from the feature amounts of the driving operations, a driving operation to be corrected in the automatic driving mode and a correction amount thereof;

storing, by a storage in the server, the driving operation to be corrected in the automatic driving mode and the correction amount thereof, in a manner associated with their corresponding position information;

correcting, by a correction processor in the server, a driving operation in the automatic driving mode, using the driving operation to be corrected and the correction amount thereof that are read out from the storage; and controlling, by a vehicle controller in the driving assistance device, the vehicle in the automatic driving mode in which the driving operation corrected by the correction processor is included.

9. A driving assistance device for assisting driving of a vehicle using switching between an automatic driving mode and a manual driving mode by a driver, comprising:

an information receiver that acquires respective position information of the vehicle and feature amounts of driving operations by the driver, as triggered by occurrence of switching in driving of the vehicle from the automatic driving mode to the manual driving mode;

a determination processor that, on a basis of a difference between feature amounts of the driving operations set in the automatic driving mode and feature amounts of the driving operations by the driver, determines from the feature amounts of the driving operations by the driver acquired by the information receiver, a driving operation to be corrected in the automatic driving mode and a correction amount thereof;

a storage that stores the driving operation to be corrected and the correction amount thereof that are determined by the determination processor, in a manner associated with their corresponding position information;

a correction processor that corrects a driving operation in the automatic driving mode, using the driving operation to be corrected and the correction amount thereof that are read out from the storage; and a vehicle controller that controls the vehicle in the automatic driving mode in which the driving operation corrected by the correction processor is included, wherein the correction processor calculates the number of times switched from the automatic driving mode to the manual driving mode relative to the number of times traveled on a same route, as a degree of dissatisfaction against the automatic driving mode, and weights the correction amount by the degree of dissatisfaction.

10. A driving assistance method of assisting driving of a vehicle using switching between an automatic driving mode and a manual driving mode by a driver, said driving assistance method comprising:

acquiring, by an information receiver, respective position information of the vehicle and feature amounts of driving operations by the driver, as triggered by occurrence of switching in driving of the vehicle from the automatic driving mode to the manual driving mode;

determining, by a determination processor, on a basis of a difference between feature amounts of the driving operations set in the automatic driving mode and feature amounts of the driving operations by the driver, from the feature amounts of the driving operations by the driver acquired by the information receiver, a driving operation to be corrected in the automatic driving mode and a correction amount thereof;

storing, by a storage, the driving operation to be corrected in the automatic driving mode and the correction amount thereof, in a manner associated with their corresponding position information;

correcting, by a correction processor, a driving operation in the automatic driving mode, using the driving operation to be corrected and the correction amount thereof that are read out from the storage; and controlling, by a vehicle controller, the vehicle in the automatic driving mode in which the driving operation corrected by the correction processor is included, calculating, by the correction processor, the number of times switched from the automatic driving mode to the manual driving mode relative to the number of times traveled on a same route, as a degree of dissatisfaction against the automatic driving mode, and weighting, by the correction processor, the correction amount by the degree of dissatisfaction.

11. A driving assistance device for assisting driving of a vehicle using switching between an automatic driving mode and a manual driving mode by a driver, comprising:

an information receiver that acquires respective position information of the vehicle and feature amounts of driving operations by the driver, as triggered by occurrence of switching in driving of the vehicle from the automatic driving mode to the manual driving mode;

a determination processor that, on a basis of a difference between feature amounts of the driving operations set in the automatic driving mode and feature amounts of the driving operations by the driver, determines from the feature amounts of the driving operations by the driver acquired by the information receiver, a driving operation to be corrected in the automatic driving mode and a correction amount thereof;

a storage that stores the driving operation to be corrected and the correction amount thereof that are determined by the determination processor, in a manner associated with their corresponding position information;

a correction processor that corrects a driving operation in the automatic driving mode, using the driving operation to be corrected and the correction amount thereof that are read out from the storage; and a vehicle controller that controls the vehicle in the automatic driving mode in which the driving operation corrected by the correction processor is included, wherein the correction processor calculates the number of times switched from the automatic driving mode to the manual driving mode relative to the number of times traveled on a same route, and weights the correction amount on a basis of the calculated number of times.

12. A driving assistance method of assisting driving of a vehicle using switching between an automatic driving mode and a manual driving mode by a driver, said driving assistance method comprising:

acquiring, by an information receiver, respective position information of the vehicle and feature amounts of driving operations by the driver, as triggered by occurrence of switching in driving of the vehicle from the automatic driving mode to the manual driving mode;

determining, by a determination processor, on a basis of a difference between feature amounts of the driving operations set in the automatic driving mode and feature amounts of the driving operations by the driver, from the feature amounts of the driving operations by the driver acquired by the information receiver, a driving operation to be corrected in the automatic driving mode and a correction amount thereof;

storing, by a storage, the driving operation to be corrected in the automatic driving mode and the correction amount thereof, in a manner associated with their corresponding position information;

correcting, by a correction processor, a driving operation in the automatic driving mode, using the driving operation to be corrected and the correction amount thereof that are read out from the storage; and controlling, by a vehicle controller, the vehicle in the automatic driving mode in which the driving operation corrected by the correction processor is included, calculating, by the correction processor, the number of times switched from the automatic driving mode to the manual driving mode relative to the number of times traveled on a same route, and weighting, by the correction processor, the correction amount on a basis of the calculated number of times.

13. A driving assistance method of assisting driving of a vehicle using switching between an automatic driving mode and a manual driving mode by a driver, said driving assistance method comprising:

acquiring, by an information receiver in a driving assistance device, respective position information of the vehicle and feature amounts of driving operations by the driver, as triggered by occurrence of switching in driving of the vehicle from the automatic driving mode to the manual driving mode, followed by transmitting them to a server;

determining, by a determination processor in the server, on a basis of a difference between feature amounts of the driving operations set in the automatic driving mode and feature amounts of the driving operations by the driver, from the feature amounts of the driving operations by the driver acquired by the information receiver, a driving operation to be corrected in the automatic driving mode and a correction amount thereof;

storing, by a storage in the server, the driving operation to be corrected in the automatic driving mode and the correction amount thereof, in a manner associated with their corresponding position information;

correcting, by a correction processor in the server, a driving operation in the automatic driving mode, using the driving operation to be corrected and the correction amount thereof that are read out from the storage; and controlling, by a vehicle controller in the driving assistance device, the vehicle in the automatic driving mode in which the driving operation corrected by the correction processor is included, calculating, by the correction processor, the number of times switched from the automatic driving mode to the manual driving mode relative to the number of times traveled on a same route, and weighting, by the correction processor, the correction amount on a basis of the calculated number of times.

* * * * *